United States Patent [19]
Kish

[11] Patent Number: 4,665,841
[45] Date of Patent: May 19, 1987

[54] PROCESS AND APPARATUS FOR TREATING MUNICIPAL TRASH

[76] Inventor: Charles A. Kish, 1600 Black Rock Rd., Royersford, Pa. 19468

[21] Appl. No.: 864,004

[22] Filed: May 16, 1986

[51] Int. Cl.⁴ .............................................. F23B 7/00
[52] U.S. Cl. .................................... 110/234; 110/229; 110/235; 110/259; 110/346; 122/2
[58] Field of Search ............... 110/234, 235, 229, 233, 110/259, 346; 122/2

[56] References Cited

U.S. PATENT DOCUMENTS

| | | | |
|---|---|---|---|
| 4,091,748 | 5/1978 | Mansfield | 110/234 X |
| 4,291,636 | 9/1981 | Bergsten et al. | 110/346 |
| 4,531,463 | 7/1985 | Kratz et al. | 110/234 X |
| 4,602,573 | 7/1986 | Tanca | 110/229 |

Primary Examiner—Edward G. Favors
Attorney, Agent, or Firm—Steele, Gould & Fried

[57] ABSTRACT

The present invention relates to a system and a process for converting municipal trash into useful materials without wasting useful energy and with a minimum release of pollutants into the atmosphere. The system includes hydraulic means which moves rubbish, garbage and other municipal trash into a processor. The system in the processor contains a trash processing zone which is associated with the hdyraulic means, a fractionating system built into the roof, a combustion zone, a heating exchange zone, a waste heat recovery system and a precipitator for cleaning the emissions prior to release into the atmosphere.

24 Claims, 12 Drawing Figures

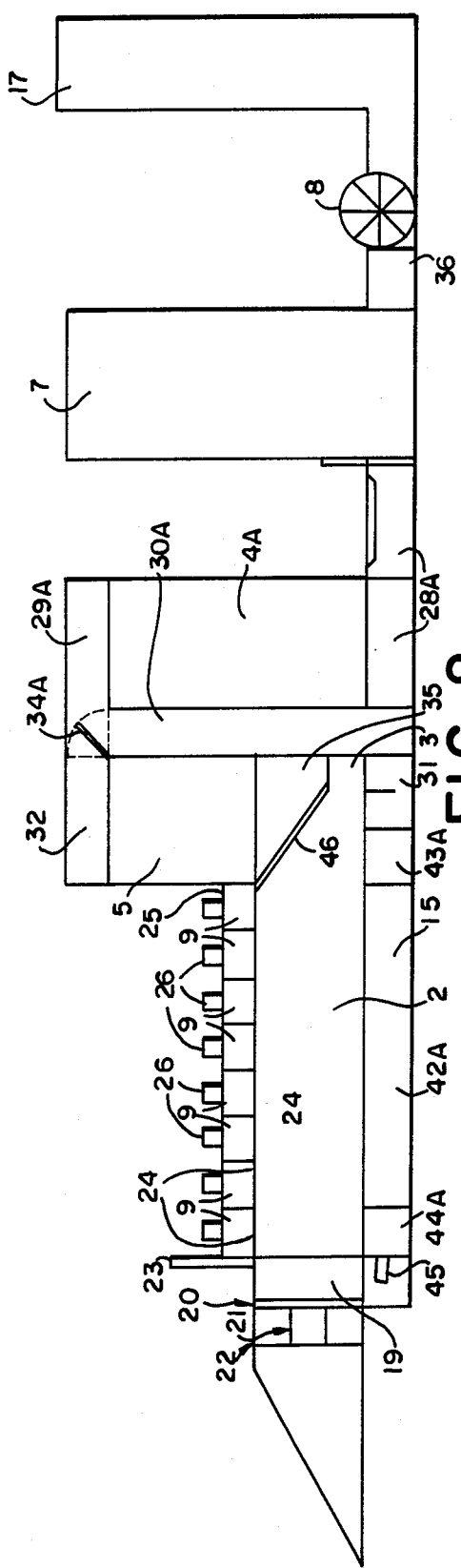
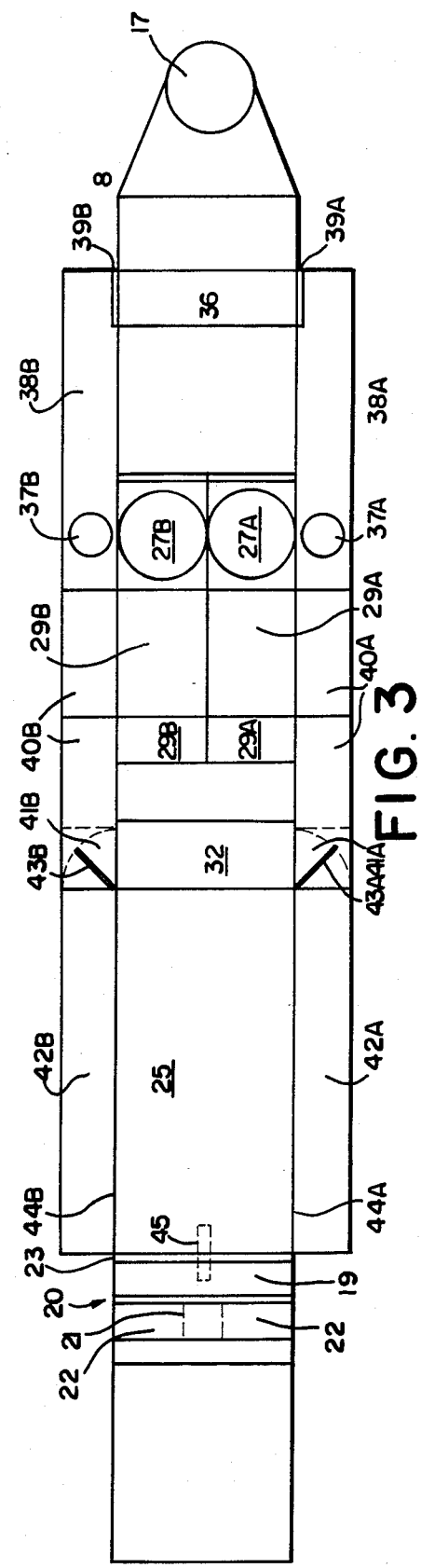
FIG. 2
FIG. 3

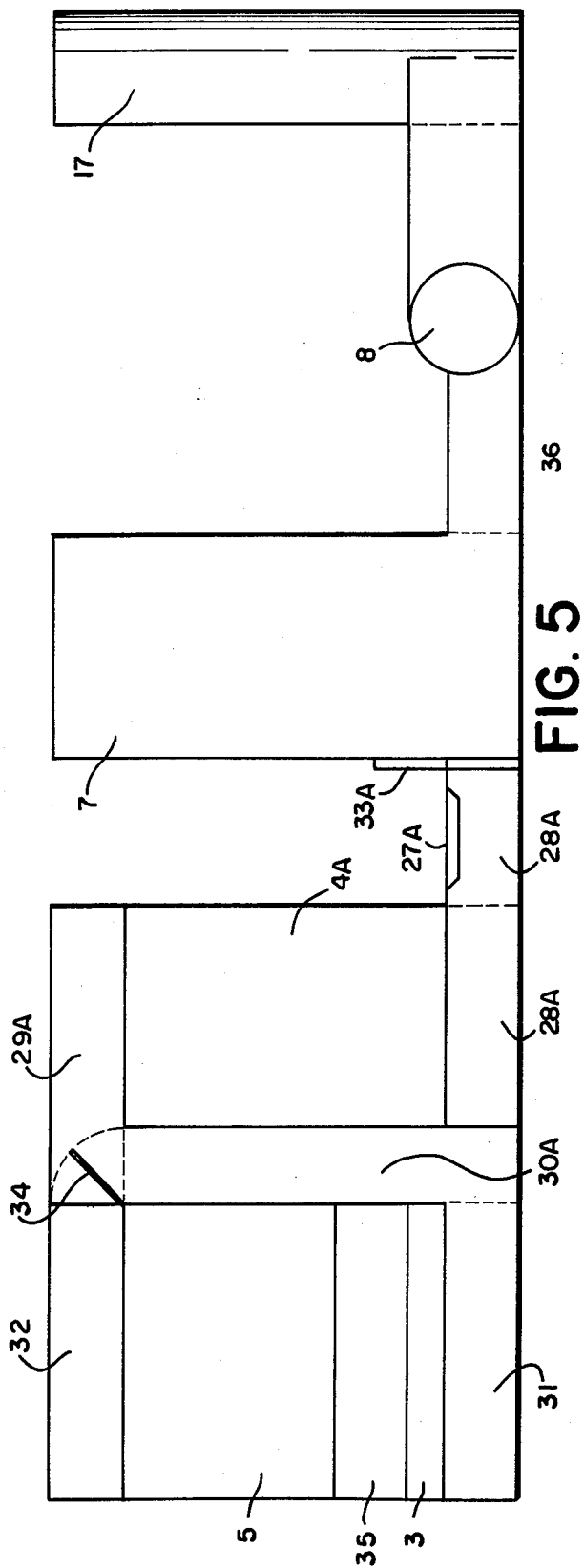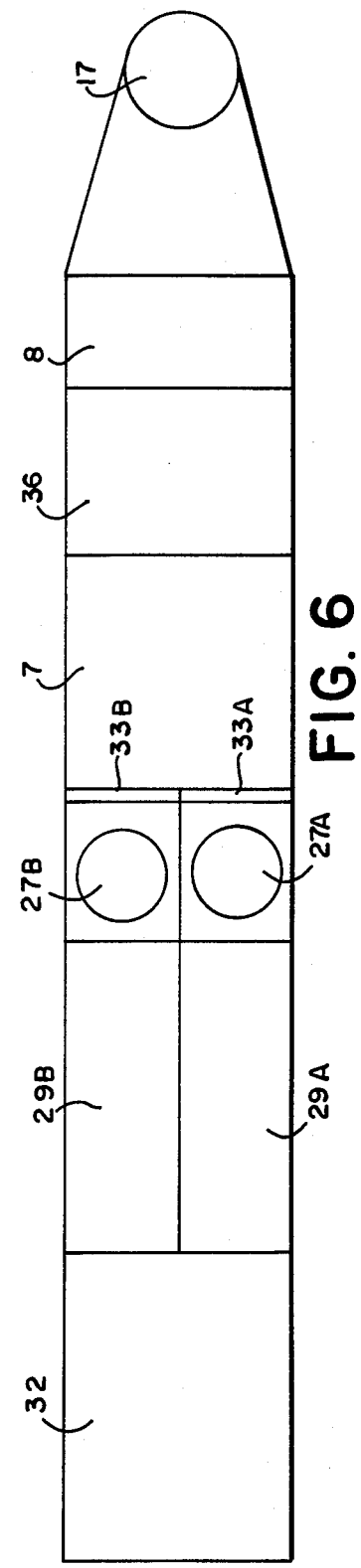

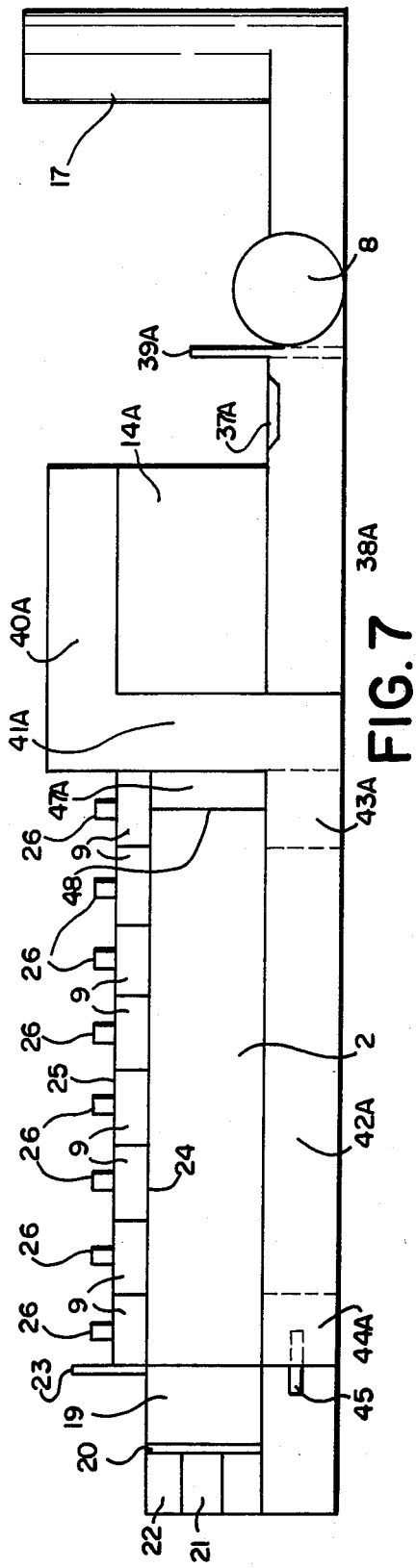
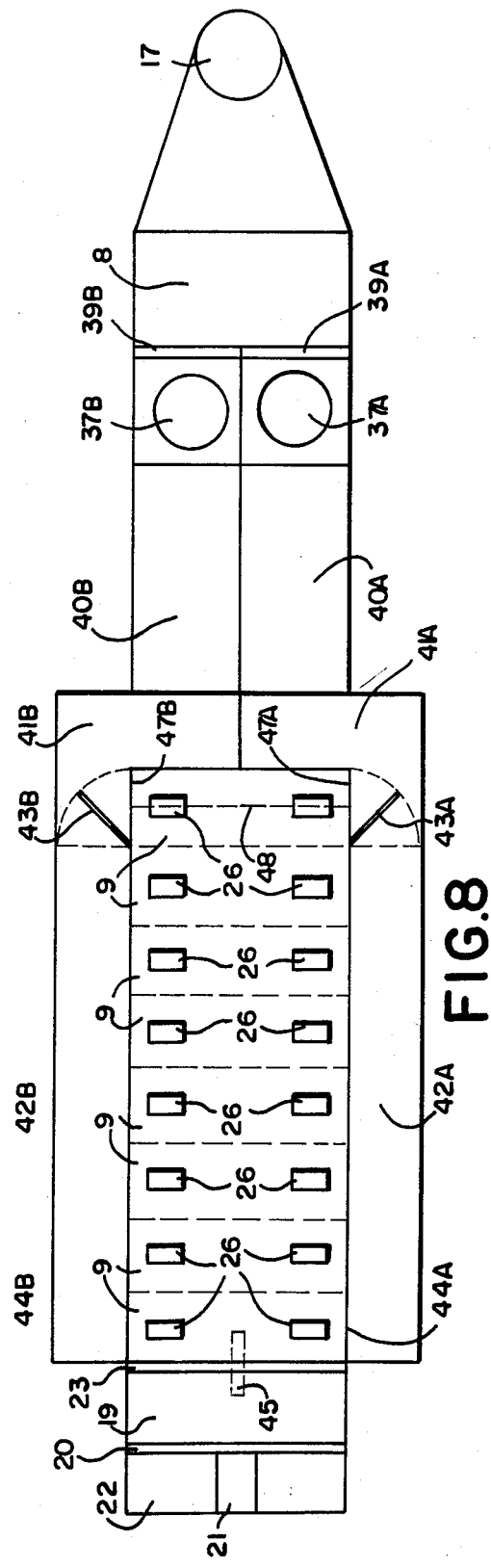
FIG.7
FIG.8

PROCESS AND APPARATUS FOR TREATING MUNICIPAL TRASH

FIELD OF THE INVENTION

The present invention relates to a process and a system for treating trash so as to recover valuable and useful components. More particularly, the present invention provides a process and apparatus for converting trash into useful materials while minimizing the release of pollutants into the environment.

BACKGROUND OF THE INVENTION

Since low initial cost and reduced running cost are usually essential requirements for treating municipal wastes, it is desirable that the furnace used be directly heated with the combustible gases derived from the processor. To assure maximum combustion temperature, air or like gas must be preheated prior to combustion in sufficient volumes to burn the required gas flow in order to treat the volumes of waste being processed in the desired time period.

With a system in which air and/or like gas are fed to a high-temperature furnace bed of combustible carbonaceous material from below to effect combustion to cause the resulting combustion gas to flow upward, dust of the waste and ash are exposed to, and scattered upward by, a large quantity of combustion gas flowing at a high speed, with the result that the dust will be released from the furnace as entrained in the combustion gas. The exhaust gas is therefore very likely to cause secondary pollution or clog up, damage or overheat the exhaust duct.

Conversely with another system in which the gas for combustion is fed to the high-temperature furnace bed from above to cause the resulting combustion gas to flow downward, the water contained in the waste will flow down along with the combustion gas, giving a reduced temperature to the lower portion of the bed. Additionally, the carbon dioxide and water resulting from the combustion of the waste, or the water initially contained in the waste also flows downward with the combustion gas undergoing a reduction reaction with the carbon component of the combustible carbonaceous material in the lower portion of the furnace bed to absorb the ambient heat and eventually reducing the temperature of the lower portion of the bed. At a reduced temperature, the product will block up and will not be run off from the furnace smoothly.

Secondary pollution and other objections due to the exhaust gas could be prevented with use of a secondary combustion chamber or combustion promoting device, or by returning the exhaust gas into the furnace, while an additional heater, if provided for the lower portion of the bed, would be useful for keeping this portion at the desired high temperature. Such means, however, would render the furnace construction complex and result in an increase in the initial cost as well as in the running cost due to damage to the structure.

U.S. Pat. No. 4,029,026 of Normantas discloses pollution-free incinerators in which slow, starved oxygen combustion is commenced at the base of a primary combustion chamber which utilizes gases generated from the initial combustion area to fire the primary combustion chamber and to burn gases generated therefrom.

U.S. Pat. No. 4,376,373 of Weber et al relates to a system for incinerating scrap automobiles whereby waste oil volatile compounds are collected and heat from an incinerator is used to break down waste oil in a cracking tower.

U.S. Pat. No. 4,452,152 of John et al discloses an incinerator steam generation system which utilizes heat derived from municipal waste to produce steam for steam boiler, electrical generating facilities, heating facility for industrial plants and the like.

U.S. Pat. No. 4,253,405 of Cottrell et al relates to a system for incinerating combustible solid waste and for resolving ash and heat from streams of by-products of combustion.

U.S. Pat. No. 4,437,419 of Karl R. Hertel, which is incorporated herein by reference, discloses a system for incinerating waste and reclaiming resources in a separate output stream.

SUMMARY OF THE INVENTION

The present invention relates to a system and a process for converting municipal trash into useful materials without wasting useful energy and with a minimum release of pollutants into the atmosphere. The system includes hydraulic means which moves rubbish, garbage and other municipal trash into an incinerator. The incinerator utilized in the present invention contains hydraulic means associated with a trash processing zone. Built into the roof of the processing zone is a fractionating system for collection and separation of volatiles and their separation into various grades of oils and gases.

The trash is not sorted prior to charging. It is charged the same way it is dumped. At different temperatures the metals can be sorted, for example, at 1250 degrees F. aluminum melts, around 2000 degrees F. copper and brass melt leaving steel scrap as residue. The aluminum, copper and brass can be pigged for easier handling. The trash processing zone receives the trash and is heated to remove the volatile materials which are collected in a collection area. The residue is placed into the combustion zone wherein it is treated with heated air prior to combustion. The heat from the combustion zone then flows through the heat exchange zone for generation of steam which drives a turbine-generator, for example for the generation of electricity.

The volatile materials from the collection zone are passed to a fractionating means wherein the various components of the volatile material are separated and collected by use of spent steam from the turbine-generator.

U.S. Pat. No. 4,253,405 of Cottrel relates to a system for incinerating combustible solid waste and for resolving ash and heat from streams of by-products of combustions.

U.S. Pat. No. 4,437,419 of Karl R. Hertel which is incorporated herein by reference, discloses a system for incinerating waste and reclaiming resources in a separate output stream.

SUMMARY OF THE INVENTION

The present invention relates to a system in a process converting municipal trash into useful materials without wasting useful energy and with a minimum release of pollutants into the atmosphere. The system includes hydraulic means which removes rubbish, garbage and other municipal trash into an incinerator. The incinerator utilized in the invention contains hydraulic means associated with a trash processing zone built into the roof of the processing zone as a fractionating system for the collection of volatiles and the separation of those volatiles into their various grades of oils and gases. There is further provided a combustion zone with a heat exchange zone for the generation of steam, a waste heat recovery system with a means for returning heat to the combustion reaction, a precipitator for treating the exhaust gases and a variable speed ejection fan for controlling combustion rates. Associated with the heat exchange zone is a turbine generator with means for returning spent steam back to the boiler. Associated with the fractionating system is a means for transporting the volatiles to an oil storage area or gas storage area.

According to the present process, the trash processing zone receives trash and it is heated in the absence of air so as to release the volatile materials which are collected in the roof and a series of chambers down through the processing zone where the temperature varies from atmospheric to about 1500° F. As many chambers as desired may be employed, which will yield the different grades of by-products. Each zone varies slightly less than 200° from one to the next. The approximate time travel from one zone to the next is about two hours. The 200° F. temperature increase is gradual and steady so that computerized controls could cause vapor separation as the temperature progresses through the various zones, if this is desired. The residue after processing is conveyed into a combustion chamber wherein it is burned with pre-heated air providing temperatures in the combustion chamber beyond 3000° F. The heat from the combustion zone then flows through a heat exchange boiler for the generation of steam which drives a turbine generator, for example, for the generation of electricity. The volatile materials from the collection zone are partially cracked by a fractionating means built into the roof wherein the various components of the volatile materials are separated and collected. The low temperature volatiles can be further cracked in a fractionating column heated by the heat from spent steam from the turbine generator.

An essential feature of the invention resides in the use of checkers or heating ducts throughout the system for increasing the efficiency of the combustion process. The function of a checker is to capture heat from the waste heat gases in the exhaust cycle and retain that heat so as to pre-heat the incoming air when the cycle reverses. By returning these Btu's into the incoming air, the temperature of the reaction in the combustion chamber increases to much higher temperatures because of the Btu input. Air being only 20% oxygen and the rest being mostly nitrogen does not support combustion and, therefore, retards combustion. The added mass of nitrogen requires many Btu's of heat energy for heating. Therefore, any Btu's imparted by the checkers increases combustion temperatures. Although these increased temperatures cannot be sustained because the cooling effect of air on the checkers by the time the checker cools to 1000° F., the average mean temperature is 1500° F. or 21,360 Btu's returned to the combustion reaction. At the higher temperatures, the fuel is more cleanly burnt, eliminating the problems of impurities found in the low temperature combustion systems.

Another problem with burning trash is the presence of non-combustible material. As much as 500 pounds of the material is found in the average ton of municipal waste, which requires considerable Btu input to offset its effect on the combustion temperatures generated. To a degree, this non-combustible material is responsible for the low efficiency of most incineration systems now in use. Also, the use of cold air for combustion has a greater deleterious effect. In the invention, the heat used in processing is conserved by passing directly from the processing chamber into the combustion chamber. Bothe the heat contained in the carbon residue and the non-combustible material is conserved. During processing, many of the toxic substances or all are removed prior to combustion in the combustion chamber. Only a clean carbon residue is burned in the combustion chamber. The other toxic materials are captured during the processing procedure with the volatile oils. Due to the high operating temperatures of the combustion chamber, most of the non-combustibles are melted down, reducing their bulk, thereby conserving landfill space.

Checkers utilized in the invention are preferably constructed of either brick work or they may be poured from a refractory material. They are constructed in such a way as to provide air passageways through them for the transfer of heat from the waste heat gases to the mass that they are constructed of. Because of their mass, they have the ability to retain this heat energy. Likewise in the cooling cycle, the checkers can transfer this retained heat energy to the incoming air, pre-heating the air prior to combustion. A form of the checkers utilized in the present invention is disclosed in U.S. Pat. No. 3,859,933 of Von Klenck, which is herewith incorporated by reference. There are preferably two checkers employed, while one is heating, the other is cooling and they are periodically reversed as needed to perform their function. In this manner, higher than normal temperatures are possible.

One object of the invention is to provide a system for reducing pollution during the processing of municipal trash.

Another object of the invention is to reclaim valuable components and oils from trash.

Still another object of the invention is to provide a means for conserving fuel resources and generating electrical power by the use of municipal trash derived fuel.

Yet still another object of the invention is to provide a source for landfill and for use foundation fill material for conserving dump space.

A further objective of the invention is to process any material that is organic in origin such as sewage sludge, dirty coal and for cleaning burnable trash or any other organic refuse that one might wish to process. While the process is originally designed for the processing of trash, it is capable of handling other materials efficiently and reclaiming any contained oils for producing high quality fuel or converting the process residue directly into electrical energy. By utilizing these materials, a new fuel resource is made available that was not available before, thereby conserving fossil fuel reserves such as coal and oil for future use.

BRIEF DESCRIPTION OF THE DRAWINGS

The present invention may be best understood by reference to the following description taken into consideration with the accompanying drawings wherein

FIG. 2 is a schematic side view of the processing apparatus of the system of FIG. 1.

FIG. 3 is a top view of the processing apparatus of FIG. 2.

FIG. 5 is a side view of the combustion system for burning solid type fuel.

FIG. 6 is a top view of FIG. 5.

FIG. 7 is a side view of a unit for the conversion of trash into fuel.

FIG. 8 is a top view of the unit of FIG. 8.

DETAILED DESCRIPTION OF THE PREFERRED EMBODIMENTS

Figure 1:
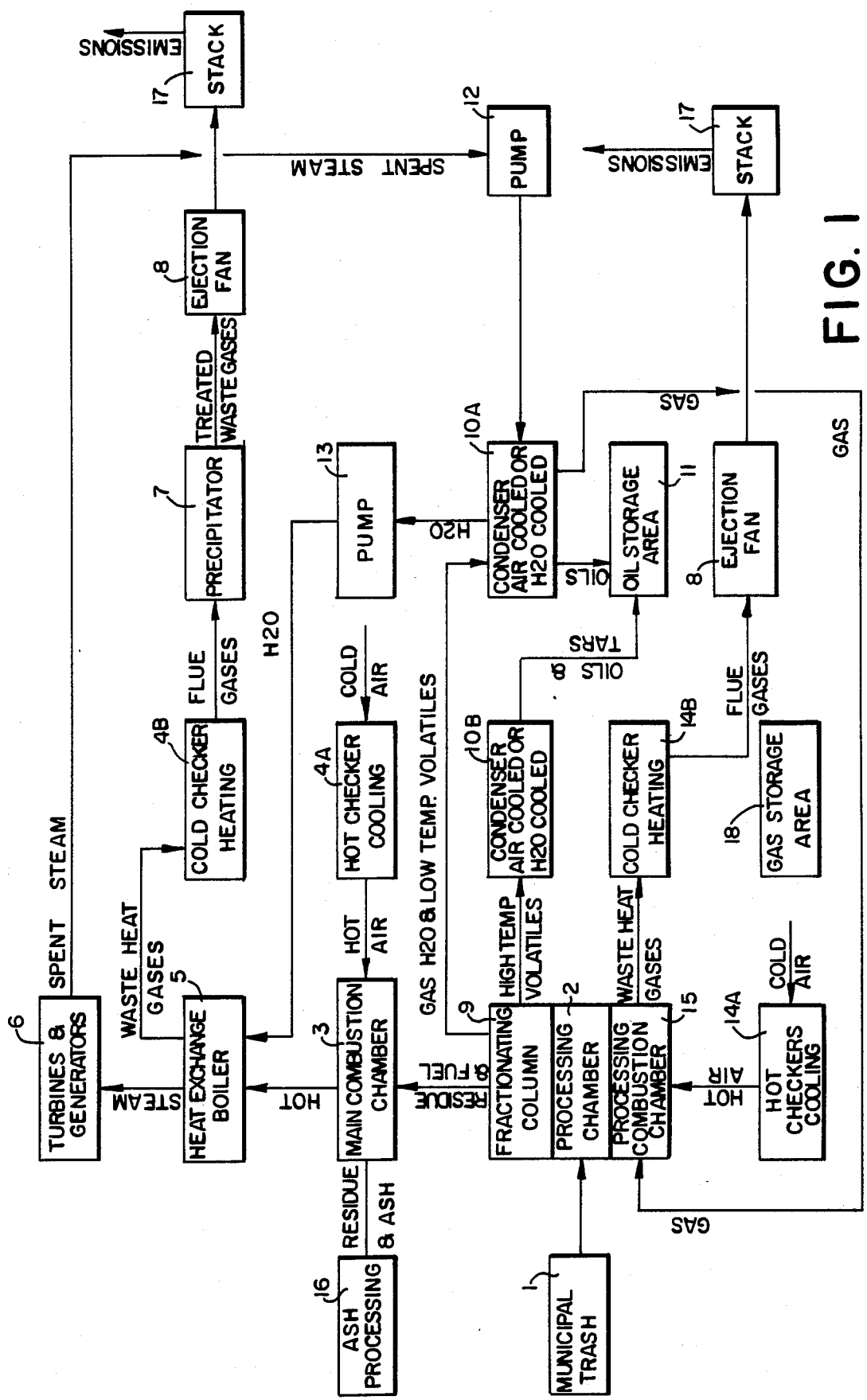
FIG. 1 is a schematic diagram of the process and a system for treating municipal waste and the handling of other organic materials being processed.

With reference to FIG. 1, it will be seen that municipal trash 1 is moved to a processing zone 2. In processing zone 2, the trash is heated by gases and air from the combustion chamber 16 passing into the processing chamber 2 to drive off all oils, tars, gases, water, etc. and to leave a solid carbonaceous residue mixed with any contained non-combustible material. The mixed residue is moved into combustion zone 3, where cool air is heated by checker 4a to obtain maximum combustion efficiency. The hot gases from combustion zone 3 are passed to the heat exchange boiler zone 5 where it is utilized to generate steam that drives a turbine 6 that is coupled to a generator. The spent steam from turbine 6 is passed through a pump 12 and then to a condensor 10A. The water from the condensor 10A then goes to a pump 13 and from there back to the heat exchanger boiler 5. The waste heat gases from the heating exchanger boiler 5 travel to the cold checker 4b heating it, then to the precipitator 7, from the precipitator 7 to an ejection fan 8, through the ejection fan 8 into the stack 17 and then into the atmosphere. The gas from the condensor 10a travels to the gas storage area 18, then to the processor combustion chamber 15, where it unites with hot air from the checker 14a. The waste heat gases from the processor combustion chamber 15 then travels to the checker 14B so as to heat it. The flue gases from the checker 14b then pass through a variable speed ejection fan 8, from there into the stack 17, then into the atmosphere. The heat generated in the processor combustion chamber 15 travels by convection through the processing zone 2 driving out the volatile oils, tars, gases and water into the fractionating system in the roof 9. By separate lines, the various fractions are moved to a series of condensors 10a and 10b for condensing. Condensor 10a is a combination fractionating column and condensor heated by spent steam from the turbine generator 6 for cracking low temperature volatiles. The high temperature volatiles are condensed in the condensor 10b. From condensor 10b, the oils and tars are removed to an oil storage area 11. The ashes are removed from under the main combustion chamber 3 by a conveyor system to an ash processing zone 16.

Figure 4A:
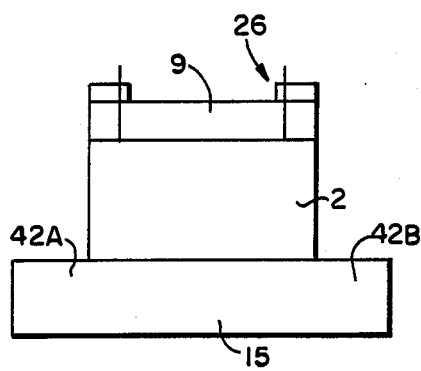
FIGS. 4A and 4B are schematic end views at different points length of the processor of FIGS. 2 and 3.
Figure 4B:
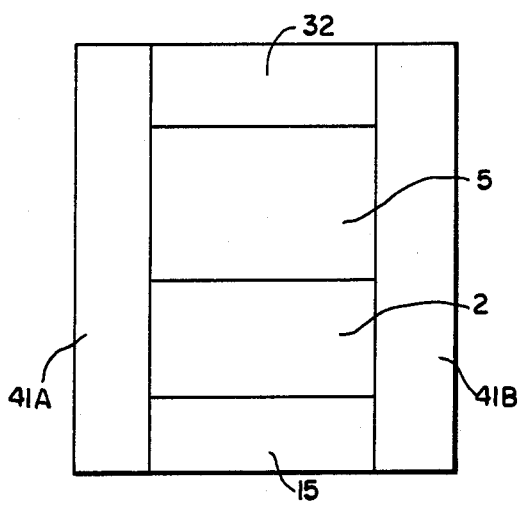
Figure 2A:
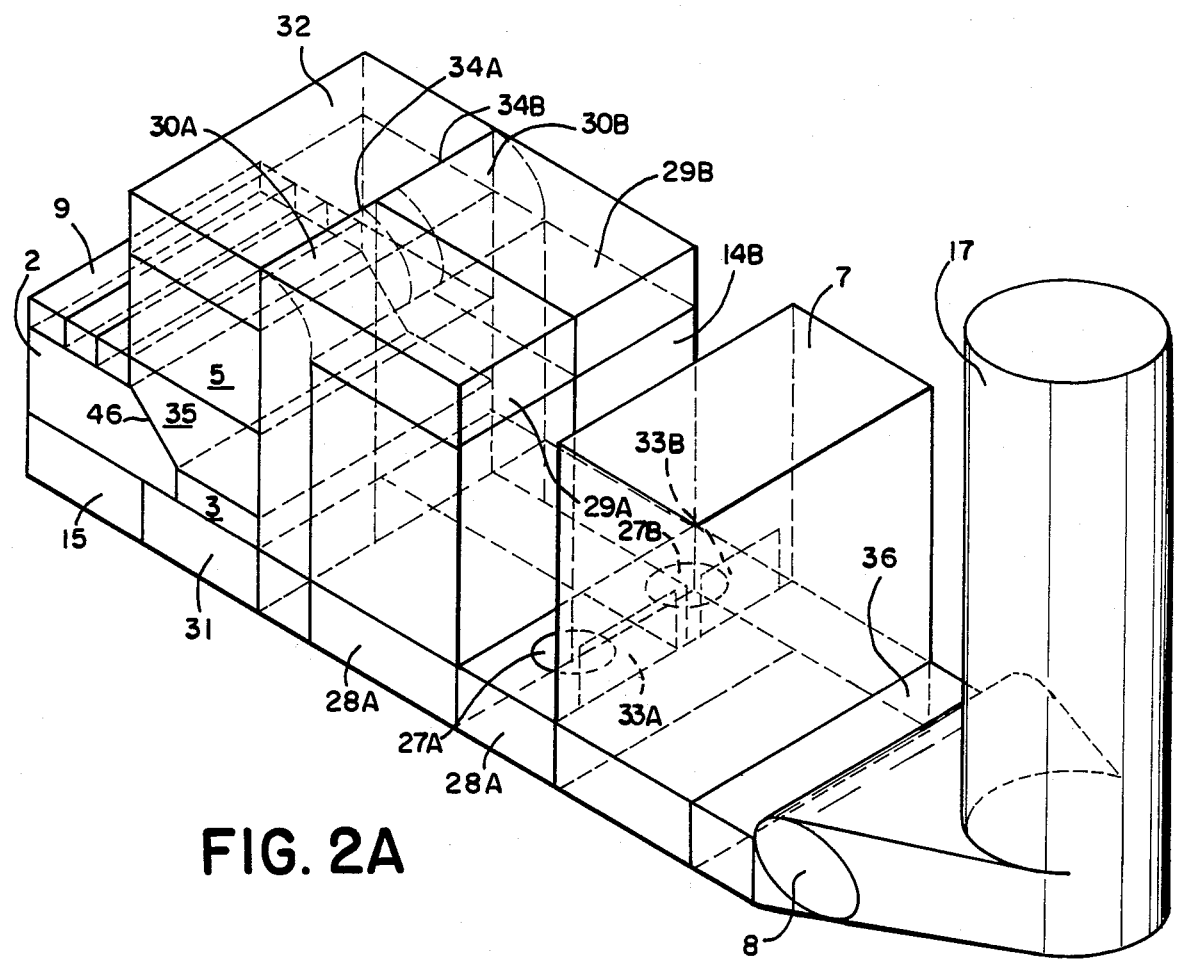
FIG. 2A is a perspective view of the processing zone of FIG. 2 with fractionating zones and an extruder means for reducing the depth of the combustion residue.

FIGS. 2-4 illustrate the process where the trash is dumped into chamber 19. A lid 23 is lowered to the horizontal position then movable roof sections 24 by means of mechanisms 26 are lowered to maintain the air space in the fractionating zones 9 and stationary roof 25. A ram 21 pushes ram plate 20 through the dump area 19 into the processing zone 2, through a water cooled extruder 46 and into the main combustion chamber 3. Then the movable roof 24 retracts and creates an air space in the fractionating zone 9 for the collection of volatiles. Air enters air lid 27A into the flue passageway 28A underneath to the checker 4A while the damper 33A is closed. The air then passes up through the checkers 4A into the chamber 29A and deflected downward by damper 34A in the vertical position into and through the passageway 30A into the ash pit 31, then up through combustion zone 3 into a hot gas holding area 35 and through the heat exchange boiler 5 into the waste heat collection hood 32. The air then passes through the damper 34B in the horizontal position closing of the passageway 30B into the chamber 29B down through the checker 4B into flue 28B past the closed air lid 27B through the open damper 33B into the precipitator 7, out of the precipitator 7 through the variable speed ejection fan 8 into the stack 17 and then into the atmosphere. Periodically the air flow is reversed from one side to the other to maintain incoming air temperatures for combustion purposes. The system flows from side B to side A beginning at the air lid 27B. All dampers in the air and gas flow passages are reversed. FIGS. 5 and 6 show a unit which is used separately for combustion and the production of steam. A major difference in FIGS. 5 and 6 is the method of heating the fuel. It may be burned on a grate or pulverized and blown in with compressed air, whichever is desired.

FIGS. 7 and 8 show a unit which may be used for the processing of trash or any other organic material into fuel.

As seen in FIG. 7, the fuel making material, i.e., trash, sewage, sludge, coal or any other organic material is dumped or loaded into chamber 19. The lid 23 is lowered to the horizontal position, then the movable roof sections 24 are lowered to maintain the air space in the fractionating zones 9. The ram 21 pushes the ram plate 20 through the dump area 19 into the processing zone 2 all the way to the end wall of the processor. The ram plate stays in place until the next change. The movable roof 24 is retracted to create air spaces in the fractionating zones 9 for the collection of volatiles. When it is time for a new charge, the movable roof 24 is lowered and the exit door 47b is opened to permit removal of the process fuel material. The pusher head 47a with its attached movable wall 48 pushes the processed residue out through the exit opening 47b into a waiting car or conveyor system for disposal or further processing. When the push is complete, the exit door 47b is replaced and the pusher head 47a with its movable wall 48 is extracted to the other side of the processor so as to form a door to close off the processing chamber 2. The ran 21 is then retracted into the withdrawl area 22 for a new charge. The lid 23 is raised to the vertical position and a new charge is placed in the chamber 19. Then the cycle repeats itself until the next push. The pusher can be electrically, mechanically hydraulically operated or any of such combination to perform its function. If the processing chamber is made longer, the push cycle may be shorter. Also the processor can be made any size desired. It can be made wider or longer to increase its capacity, although the practical limits may be about 300 ton a day.

The movement of air and gas flow pass through the processor combustion system under the processing chamber as shown in FIGS. 2, 2A, 3, 4, 7 and 8. Air enters through air lid 37a into passageway 38a when damper 39a is closed. Air then travels through the passageway 38a underneath the checkers 14a, up through the checkers to the passageway 40a and then down through the passageway 41a past the damper 43a which closes off the combustion chamber 15 into the passageway 42a. The air then travels down to the entrance of the processor combustion chamber 44a and into the combustion chamber 15 where it unites with gas or oil from the water cooled burner 45 to be burned in the combustion chamber. Waste heat gases leave through the opening controlled by the damper 43b, which is now in a position to close off passageway 42b and into passageway 41b. From passageway 41b the waste heat gases pass up to the passageway 40b, across and down through the checker 14b, into the passageway 38b past the air lid closed 37b and then through the open damper 39b to the ejection fan 8 through the ejection fan 8 into the stack 17 and out into the atmosphere. The cycle may be reversed about every eight minutes where it flows in the opposite direction beginning at the air lid 37b and through side B and then out side A.

Figure 9:
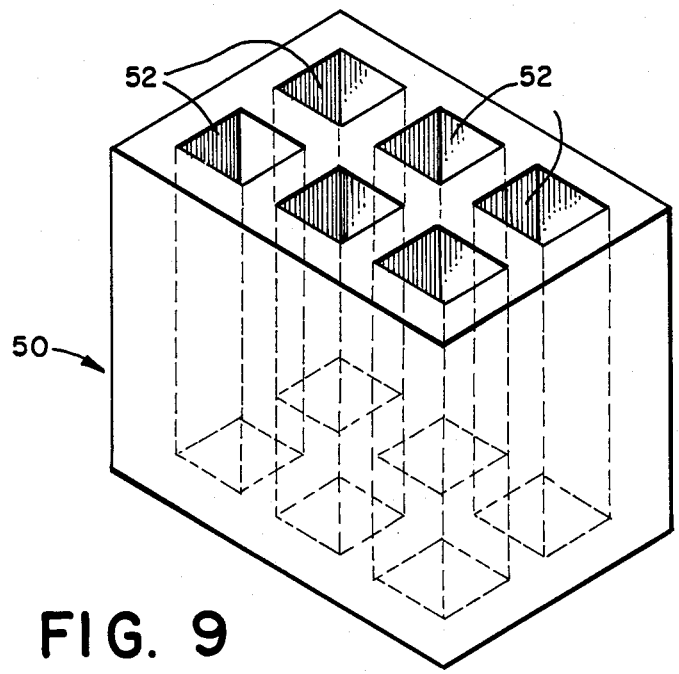
FIG. 9 is a perspective view of a checker.

As seen in FIG. 9, the checker 50 has a plurality of heating ducts 52. The extension is preferably made of ceramic materials having heating ducts 52 running therein.

Figure 10:
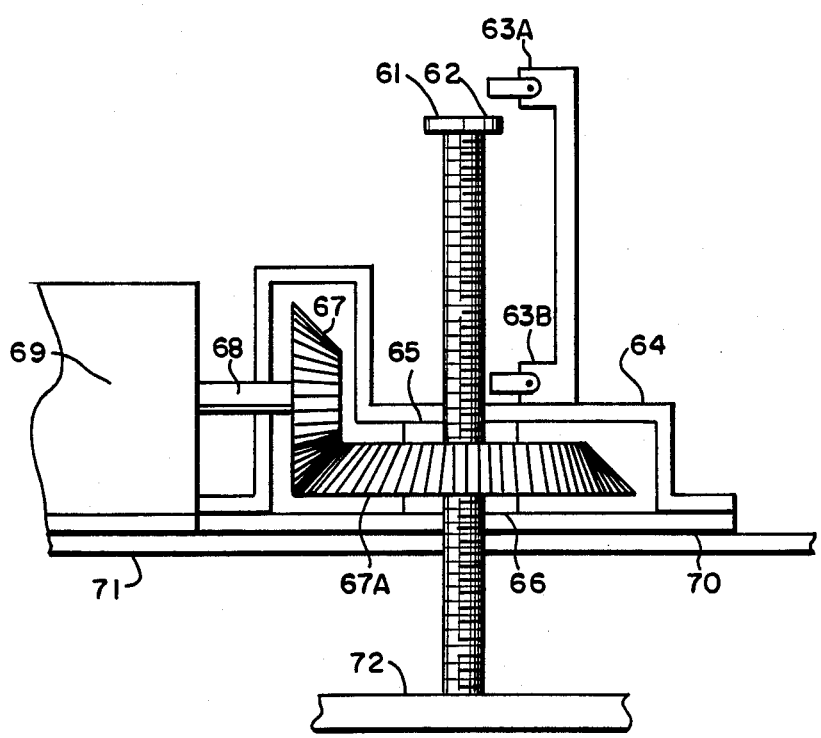
FIG. 10 is a schematic view of a movable roof mechanism for moving the movable roof of FIG. 1.

As shown in FIG. 10 the mechanism for moving the movable roof comprises a reversible motor power unit 69 which is mounted on the roof 71. Roof 71 contains a movable section 72 that is fixed for movement to a jackscrew 61. The power unit 69 is operatively associated with a motor drive gear 67 through shaft 68. The drive is also provided with a driven gear 67A that is mounted on thrust bearings 65 and 66 which raises and lowers the jackscrew 61. The jackscrew 61 contains a tripper means 62 which trips limit switches 63A and 63B which control the extent that the roof section 72 moves. Advantageously, the gear drives are enclosed within a housing 64.

The residue from the combustion zone, which consists essentially of slag and ash, for use as land fill, construction material, and the like can be periodically removed.

The gases exiting the incinerator or processing chamber may be mixed with steam in the presence of a suitable catalyst and thereby form a liquid fuel which may be separated or used in the process. Alternatively, the gases could be burnt to drive an engine which could be connected to an electrical generator to produce electricity.

The recyclible metals are generally unaffected by the carbonization process within the combustion area. Such metals will exit from the carbonization zone with carbonized materials and ash which normally varies in chemical analysis substantially according to the makeup of the feed material along with burning temperature and oxygen supply within the processing zone. In many cases, the metals may be recovered by means of screening and magnetic separations.

The process described may be batchwise or continuous; however, the continuous type of process is preferred. It is noted that any material carbonized may be utilized in the process, even when containing a substantial amount of water.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. In a system for incinerating municipal trash having a processing cycle and an exhaust cycle, the improvement comprising:
   a. incinerator means comprising a processing zone and a combustion zone,
      said processing zone comprising convection heating means for heating municipal trash;
      means for moving residue from said processing zone to said combustion zone, and grate means for collecting non-combustible residue and conveying said non-combustible residue out of said combustion zone;
      said combustion zone containing means for burning said residue;
   b. first checker means for introducing heated air into said processing zone combustion chamber so as to volatize oil and tar by-products and gaseous by-products;
   c. second checker means for introducing heated air into said combustion zone for combustion of said residue;
   d. fractionator means associated with said processing zone for separating said oils and tar by-products and gaseous by-products from said processing zone;
   e. third checker means for recovering waste heat in an exhaust cycle;
   f. a heat exchanger zone associated with said combustion zone for receiving heated gases from said combustion zone, and
   g. means for introducing water into said heat exchanger zone for generating steam.

2. The system of claim 1 wherein said means for introducing water into the said heat exchanger zone is a condensor associated with said fractionator means, said condensor receiving steam emitted from said fractionator means.

3. The system of claim 1 including a turbine generator operatively associated with said heat exchanger zone whereby steam generated in said heat exchanger zone operates said turbine generator.

4. The system of claim 3 including means for transporting spent steam from said turbine generator to said fractionator means.

5. The system of claim 1 including condensor means associated with said fractionator means for receiving and condensing steam emitted from said fractionator means and passing said condensate to said heat exchanger zone.

6. The system of claim 1 wherein said heat exchanger zone includes a fourth checker means and a precipitator into which spent gases flow respectively out of said heat exchanger zone.

7. The system of claim 6 wherein said precipitator is an electrostatic precipitator.

8. The system of claim 1 including hydraulic means for introducing trash into said processing zone.

9. The system of claim 1 wherein each of said processing zone and combustion zone contains two pair of oppositely functioning damper means.

10. The system of claim 1 wherein said processing zone and said combustion zone comprise a vertically elongated treatment chamber, said treatment chamber having a lower most chamber opening through which trash to be treated is placed, a main combustion chamber into which the treated material is moved and subjected to combination temperatures with heated air, said lower most chamber comprising movable roof sections forming a fractionating system wherein by-products are collected and separated into different grades of oil by-products.

11. The apparatus of claim 1 including a variable speed ejection fan for controlling the air and gas flow in said system.

12. A method of treating municipal trash in a system having a processing zone, fractionator means and heat exchanger means so as to recover valuable components and to generate steam comprising the steps of:
  (a) introducing said trash into a processing zone;
  (b) heating said trash through convection so as to produce oil and tar by-products, gaseous by-products and water;
  (c) removing said by-products and water components and passing them to a fractionator means for separation of said components;
  (d) burning residue from step (b) with the use of pre-heated air and then passing the heated by-products of combustion and gases to a heat exchanger means; and
  (e) recovering the residue from steps (c) and (d), and
  (f) introducing water into the said heat exchanger means to form steam.

13. The method of claim 12 including passing the steam from step (f) into a turbine generator to generate electricity.

14. The method of claim 12 wherein spent steam is collected from said turbine generator and recycled to said heat exchanger means.

15. The method claim 12 wherein water from said fractionator means is collected and passed to said heat exchanger means.

16. The method of claim 15 wherein said water from said fractionating means is collected in a condensor.

17. The method of claim 12 wherein said heat is transferred through convection from a combustion chamber under the processing area.

18. The method of claim 12 wherein said air introduced in step (d) is pre-heated.

19. The method of claim 12 wherein spent gases from said heat exchanger means are used to heat the checkers in the exhaust cycle and said checkers heat the incoming air to increase the temperature of the combustion reaction.

20. The method of claim 12 wherein spent gases from said heat exchanger means are passed through checker means, through a precipitator and then through a variable speed ejection fan into a stack into the atmoshpere.

21. The method of claim 12 including controlling the rate of flow of gases and air so as to control the combustion rate and create vacuum within the system.

22. The method of claim 12 wherein said fractionator means is formed into different zones and the volatile by-products are partially cracked and separated in the different zones.

23. The method of claim 22 including moving the different grades of volatiles to a pair of condensors for forming condensates and then to a storage area.

24. The method of claim 23 including recycling combustible gas from a gas storage area to the processor combustion chamber.

* * * * *